(12) United States Patent
Tamura et al.

(10) Patent No.: US 9,407,952 B2
(45) Date of Patent: Aug. 2, 2016

(54) CONTROL DEVICE, CONTROL METHOD, PROGRAM, AND CONTROL SYSTEM

(71) Applicant: SONY CORPORATION, Tokyo (JP)

(72) Inventors: Shigefumi Tamura, Tokyo (JP); Megumi Kikuchi, Tokyo (JP); Kenji Nishiyama, Tokyo (JP); Akira Tange, Tokyo (JP); Akira Ishizuka, Tochigi (JP); Shogo Kawata, Tokyo (JP); Akinori Kamoda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/387,459

(22) PCT Filed: Feb. 19, 2013

(86) PCT No.: PCT/JP2013/053945
§ 371 (c)(1),
(2) Date: Sep. 23, 2014

(87) PCT Pub. No.: WO2013/145936
PCT Pub. Date: Oct. 3, 2013

(65) Prior Publication Data
US 2015/0040166 A1 Feb. 5, 2015

(30) Foreign Application Priority Data
Mar. 30, 2012 (JP) ................. 2012-081698

(51) Int. Cl.
*H04N 21/433* (2011.01)
*H04N 5/76* (2006.01)
(Continued)

(52) U.S. Cl.
CPC ........ *H04N 21/4334* (2013.01); *H04L 12/2812* (2013.01); *H04L 67/10* (2013.01); *H04N 5/76* (2013.01); *H04N 7/106* (2013.01); *H04N 21/4333* (2013.01); *H04N 21/43615* (2013.01); *H04N 21/43622* (2013.01);
(Continued)

(58) Field of Classification Search
CPC ............ H04N 21/4126; H04N 21/436; H04N 21/43615; H04N 21/44218; H04N 21/44231
USPC ....................... 725/74, 85, 135, 139, 141, 142
See application file for complete search history.

(56) References Cited

U.S. PATENT DOCUMENTS 7,873,798 B2 * 1/2011 Miyazaki et al. ............. 711/154
2002/0100047 A1 * 7/2002 Matoba .................. H04H 20/76
725/46

(Continued)

FOREIGN PATENT DOCUMENTS

CN 101385344 3/2009
CN 102752654 10/2012
(Continued)

OTHER PUBLICATIONS

Search Report issued in corresponding international application No. PCT/JP2013/053945 dated Apr. 9, 2013.

*Primary Examiner* — John Schnurr
(74) *Attorney, Agent, or Firm* — Frommer Lawrence & Haug LLP; William S. Frommer

(57) ABSTRACT

Provided is a control device including a detector configured to detect use of an application on a communication terminal, and a controller configured to control recording processing related to content that is being output from a content output device associated with the communication terminal in accordance with a detection result obtained by the detector.

18 Claims, 17 Drawing Sheets

(51) Int. Cl.
*H04N 21/45* (2011.01)
*H04L 12/28* (2006.01)
*H04N 21/442* (2011.01)
*H04N 21/4788* (2011.01)
*H04L 29/08* (2006.01)
*H04N 7/10* (2006.01)
*H04N 21/436* (2011.01)

(52) U.S. Cl.
CPC .... *H04N 21/44218* (2013.01); *H04N 21/4532* (2013.01); *H04N 21/4788* (2013.01); *H04L 2012/2849* (2013.01)

(56) References Cited

U.S. PATENT DOCUMENTS

2006/0188234 A1* 8/2006 Takeshita ................ 386/107
2009/0138929 A1 5/2009 Tamura
2010/0157978 A1* 6/2010 Robbins et al. ............. 370/352
2011/0069940 A1* 3/2011 Shimy et al. .............. 386/296

FOREIGN PATENT DOCUMENTS

| | | |
|---|---|---|
| EP | 1 991 002 | 11/2008 |
| EP | 2 403 252 | 1/2012 |
| JP | 2002-77323 | 3/2002 |
| JP | 2012-55007 | 3/2002 |
| JP | 2007-96852 | 4/2007 |
| JP | 4743274 | 5/2011 |
| JP | 2011-114591 | 6/2011 |
| JP | 2011-135605 | 7/2011 |
| JP | 2012-90276 | 5/2012 |
| JP | 5048338 | 7/2012 |
| WO | WO 2006/062105 | 6/2006 |
| WO | WO 2007/094142 | 8/2007 |

* cited by examiner

| User ID | Device ID (mobile phone) | Device ID (display device) |
|---|---|---|
| User A | mobile phone A | TV A |
| User B | mobile phone B | TV A |

| USAGE PURPOSE | PLAYBACK FREQUENCY |
|---|---|
| E-MAIL | 45% |
| TELEPHONE | 72% |
| BROWSING | 12% |

FIG. 7

| User ID | Device ID | Content ID | Use | Start | End |
|---|---|---|---|---|---|
| User A | TV A (DISPLAY DEVICE 40) | Digital 8ch 21 NOV. 2011 14h 00m 00s | | 21 NOV. 2011 14h 00m 00s | |
| | mobile phone A (COMMUNICATION TERMINAL 30) | | TELEPHONE | 21 NOV. 2011 14h 35m 40s | |
| | mobile phone A (COMMUNICATION TERMINAL 30) | | TELEPHONE | | 21 NOV. 2011 14h 55m 10s |
| | TV A (DISPLAY DEVICE 40) | Digital 8ch | | | 21 NOV. 2011 14h 59m 50s |

FIG. 14

| User ID | Device ID | Content ID | Use | Start | End |
|---|---|---|---|---|---|
| User A | TV A (DISPLAY DEVICE) | CONTENT #X | | 21 NOV. 2011 14h 00m 00s | |
| | mobile phone A (COMMUNICATION TERMINAL) | | TELEPHONE | 21 NOV. 2011 14h 35m 40s | |
| | mobile phone A (COMMUNICATION TERMINAL) | | TELEPHONE | | 21 NOV. 2011 14h 55m 10s |
| | TV A (DISPLAY DEVICE) | CONTENT #X | | | 21 NOV. 2011 14h 59m 50s |

FIG. 18

| Content ID | Digest Start | Digest End | CM Start | CM End |
|---|---|---|---|---|
| Digital 8ch<br>21 NOV. 2011<br>14h 00m 00s | 00h 23m 15s | 00h 24m 20s | | |
| Digital 8ch<br>21 NOV. 2011<br>14h 00m 00s | | | 00h 25m 00s | 00h 25m 59s |
| Digital 8ch<br>21 NOV. 2011<br>14h 00m 00s | 00h 30m 00s | 00h 32m 10s | | |
| Digital 8ch<br>21 NOV. 2011<br>14h 00m 00s | 00h 45m 20s | 00h 47m 05s | | |
| Digital 8ch<br>21 NOV. 2011<br>14h 00m 00s | | | 00h 48m 00s | 00h 48m 59s |
| Digital 8ch<br>21 NOV. 2011<br>14h 00m 00s | 00h 50m 00s | 00h 53m 10s | | |

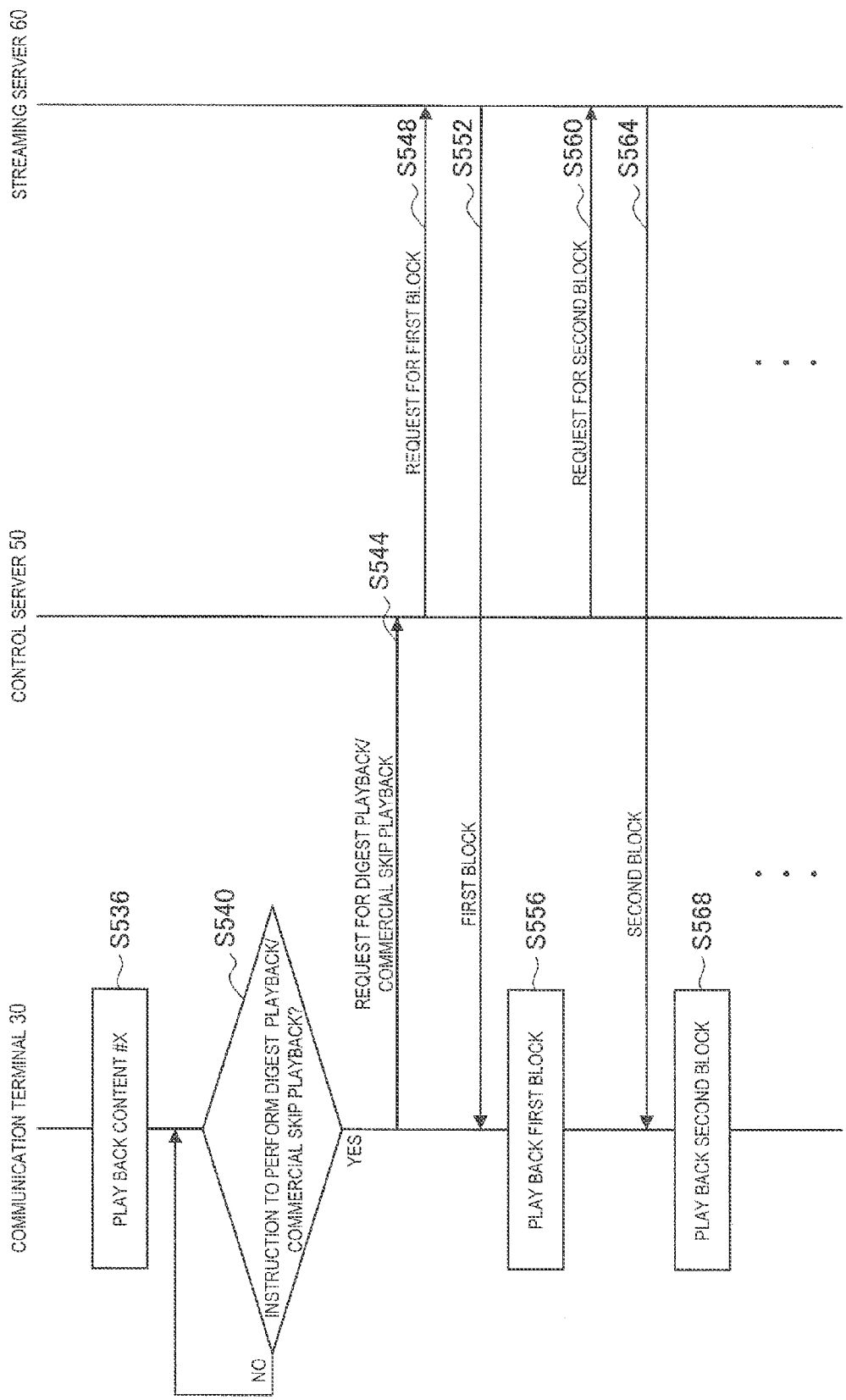

CONTROL DEVICE, CONTROL METHOD, PROGRAM, AND CONTROL SYSTEM

TECHNICAL FIELD

The present invention relates to a control device, a control method, a program, and a control system.

BACKGROUND ART

Home networks for allowing multiple home appliances to cooperate with each other have recently been drawing attention. Using a home network, content stored in a personal computer (PC) or a mobile terminal can be viewed on a display device installed at a place away from the PC or the mobile terminal, for example.

Further, Patent Literature 1 discloses a control system which, in the case where it is detected that a user who was viewing content on a first display device has moved to another room, causes the first display device to automatically display the continuation of the content on a second display device placed in a room to which the user has moved.

CITATION LIST

Patent Literature

Patent Literature 1: JP 2011-114591A

SUMMARY OF INVENTION

Technical Problem

There may be a case where, while a user views content displayed on a display device, the attention of the user may be paid to another device. For example, with the use of a communication terminal including an audio communication function and a browsing function, the attention of the user may be switched from the display device to the communication terminal. However, when the attention of the user is switched from the display device to the communication terminal, the user misses the content displayed on the display device while using the communication terminal.

Accordingly, the present disclosure proposes a control device, a control method, a program, and a control system which are novel and improved, and which are for allowing the use of the communication terminal to cooperate with processing related to the content.

Solution to Problem

According to the present disclosure, there is provided a control device including a detector configured to detect use of an application on a communication terminal, and a controller configured to control recording processing related to content that is being output from a content output device associated with the communication terminal in accordance with a detection result obtained by the detector.

Further, according to the present disclosure, there is provided a control method including detecting use of an application on a communication terminal, and controlling recording processing related to content that is being output from a content output device associated with the communication terminal in accordance with a detection result obtained by the detector.

Further, according to the present disclosure, there is provided a program for causing a computer to function as a detector configured to detect use of an application on a communication terminal, and a controller configured to record and control processing related to content that is being output from a content output device associated with the communication terminal in accordance with a detection result obtained by the detector.

Further, according to the present disclosure, there is provided a control system including a communication terminal, a content output device associated with the communication terminal, and a control device including a detector configured to detect use of an application on the communication terminal, and a controller configured to control recording processing related to content that is being output from the content output device in accordance with a detection result obtained by the detector.

Advantageous Effects of Invention

According to the present disclosure as described above, the use of the communication terminal can cooperate with processing related to the content.

BRIEF DESCRIPTION OF DRAWINGS

FIG. 7 is an explanatory diagram showing a specific example of a usage log.

FIG. 14 is an explanatory diagram showing a specific example of a usage log according to the second embodiment.

FIG. 18 is an explanatory diagram showing a specific example of information related to content.

FIG. 19 is an explanatory diagram showing an operation example of time reduction playback.

DESCRIPTION OF EMBODIMENTS

Figures 1, 2:
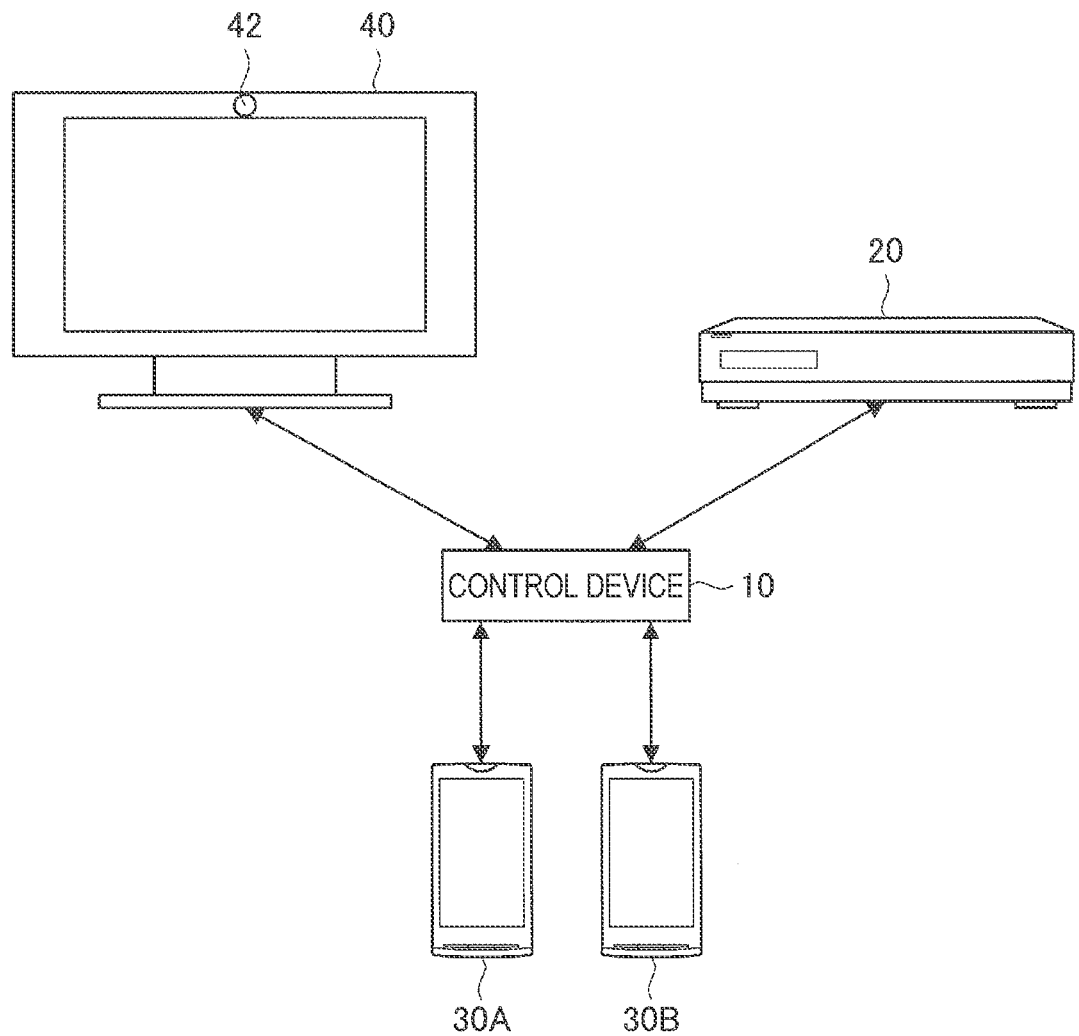
FIG. 1 is an explanatory diagram showing a configuration of a control system according to a first embodiment.
FIG. 2 is an explanatory diagram showing a specific example of a correspondence relationship between a communication terminal and a display device.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, in this specification and the appended drawings, there are some cases where multiple structural elements that have substantially the same function and structure are distinguished from one another by being denoted with different alphabets after the same reference numeral. For example, multiple structural elements that have substantially the same function and structure are distinguished from one another by being denoted by communication terminals 30A and 30B, as necessary. Note that, in the case where it is not necessary to distinguish the multiple structural elements that have substantially the same function and structure from one another, the multiple structural elements are denoted with the same reference numeral only. For example, in the case where it is not necessary to distinguish the communication terminals 30A and 30B, the communication terminals 30A and 30B are each simply referred to as communication terminal 30.

Further, the present disclosure will be described in the following order.

1. First embodiment
1-1. Overview of first embodiment
1-2. Configuration of recording device
1-3. Configuration of control device
1-4. Control operation of recording processing
1-5. Control operation of playback processing
2. Second embodiment
2-1. Overview of second embodiment
2-2. Configuration of control server
2-3. Operation of control system
3. Conclusion 1. First Embodiment <1-1. Overview of First Embodiment>

A control system according to a first embodiment of the present disclosure includes a control device 10 including
A. a detector (usage detector 136) which detects use of an application responding to reception processing of a communication terminal, and
B. a controller (recording controller 148) which controls recording processing related to content that is being output from a content output device associated with the communication terminal in accordance with a detection result obtained by the detector.

The control system according to the first embodiment of the present disclosure is capable of allowing the use of the communication terminal to cooperate with processing related to the content on the basis of the control performed by the control device 10. Hereinafter, with reference to drawings, an overview of the first embodiment of the present disclosure will be described.

(Configuration of Control System)

FIG. 1 is an explanatory diagram showing a configuration of a control system according to the first embodiment. As shown in FIG. 1, the control system according to the first embodiment includes a control device 10, a recording device 20, communication terminals 30A and 30B, and a display device 40.

The communication terminal 30 includes one or two or more applications, and performs communication corresponding to the application. Here, the application accompanies communication with an external device which is not included in the control system, and is different from an application for issuing an instruction to perform recording processing to the recording device 20. For example, the communication terminal 30 may include a telephone application (audio communication application). In this case, with the use of the telephone application, the communication terminal 30 establishes a connection with another communication terminal in response to an outgoing call from the communication terminal 30 or an incoming call from the other communication terminal, and transmits/receives an audio to/from the other communication terminal.

Further, the communication terminal 30 may include an e-mail application. In this case, with the use of the e-mail application, the communication terminal 30 transmits, as an e-mail, text data input by the user to an address designated by the user. Further, the e-mail application displays a confirmation screen of the received e-mails.

Further, the communication terminal 30 may include a browsing application. In this case, with the use of the browsing application, the communication terminal 30 may achieve acquisition and display of a web page designated by the user.

Note that the communication terminal 30 is capable of communicating through a transmission path such as a public line network such as the Internet, a telephone line network, or a satellite communication network, a local area network (LAN) including Ethernet (registered trademark), or a wide area network (WAN). Further, although FIG. 1 shows a mobile phone as the communication terminal 30, the communication terminal 30 is not limited to the mobile phone. For example, the communication terminal 30 may be an information processing apparatus such as a smartphone, a personal handyphone system (PHS), a mobile music playback device, a mobile video processing device, or a mobile game console.

The recording device 20 is a device having a function of recording content. For example, the recording device 20 may acquire television broadcast content, and may record the acquired content in a storage medium. Note that the television broadcast may be broadcast satellite (BS) broadcasting, communications satellite (CS) broadcasting, digital terrestrial broadcasting, analog terrestrial broadcasting, or cable broadcasting.

The display device 40 is an example of a content output device which outputs content including a video and an audio, and performs video display of content, audio output of content, and the like. Further, the display device 40 includes an imaging part 42 which images a range that the display device 40 is capable of viewing. A captured image obtained by the imaging part 42 or a result obtained by analyzing the captured image is transmitted to the control device 10 for associating the display device 40 with the communication terminal 30.

The control device 10 associates the communication terminal 30 with the display device 40, and, on the basis of information obtained from the communication terminal 30, the control device 10 controls recording processing and playback processing related to content. Hereinafter, the association of the communication terminal 30 with the display device 40, the control of recording processing, and the control of playback processing will be described briefly. Note that, in FIG. 1, the control device 10 is shown as a separate device from the display device 40 and the recording device 20, but a part of or the entire functions of the control device 10 can be implemented on another device such as the display device 40 or the recording device 20.

(Associating Communication Terminal with Display Device)

The control device 10 associates the display device 40 with the communication terminal 30 of a user viewing content that is being output from the display device 40. The technique of performing association is not particularly limited. As an example, the control device 10 may specify a user included in a captured image obtained by the imaging part 42 of the display device 40 by image recognition, and the communication terminal 30 registered in advance as a device of the specified user may be associated with the display device 40.

According to the relevant technique, in the case where there are a user A carrying the communication terminal 30A and a user B carrying the communication terminal 30B in front of the display device 40, as FIG. 2 shows, an ID of the user A, an ID (mobile phone A) of the communication terminal 30A, and an ID (TV A) of the display device 40 are associated with each other, and an ID of the user B, an ID (mobile phone B) of the communication terminal 30B, and an ID (TV A) of the display device 40 are associated with each other.

Note that the control device 10 is also capable of associating the communication terminal 30 with the display device 40 using another technique. For example, the control device 10 may acquire position information of the communication terminal 30, and may associate a display device 40 whose distance from the communication terminal 30 is less than or equal to a given value with the communication terminal 30. Alternatively, the association between the communication terminal 30 and the display device 40 may be set in advance by the user.

(Control of Recording Processing)

There may be a case where, while the display device 40 is outputting content, the attention of the user wanders off from the display device 40 and the user misses the content. For example, when the user uses the telephone application in response to an incoming call to the communication terminal 30, there is a case where the user misses the content that is output during the phone call.

From this viewpoint, on the basis of the use of the application of the communication terminal 30 associated with the display device 40, the control device 10 issues, to the recording device 20, an instruction to perform recording of the content output by the display device 40. According to such a configuration, since the recording of the content that the user may have missed is performed automatically, it becomes possible for the user to view afterward the part that the user has missed. Note that the detail of the recording processing will be described in "1-3. Configuration of control device" and "1-4. Control operation of recording processing".

(Control of Playback Processing)

In the case where, after the attention of the user has wandered off from the display device 40 and the recording processing has started, the attention of the user has returned to the display device 40, for example, in the case where the use of the application has terminated, the control device 10 issues, to the recording device 20, an instruction to perform chasing playback of the content recorded in the recording processing.

However, in the case where there is another user viewing the content on the display device 40, viewing of the other user is disturbed if the display device 40 starts the chasing playback. Therefore, the control device 10 according to the present embodiment determines which of the display device 40 and the user's communication terminal 30 is to output the content, in accordance with whether there is another user viewing the content on the display device 40. Note that the detail of the playback processing will be described in "1-3. Configuration of control device" and "1-5. Control operation of playback processing".

<1-2. Configuration of Recording Device>

Heretofore, the overview of the control system according to the first embodiment has been described. Next, a configuration of the recording device 20 included in the control system according to the first embodiment will be described.

Figures 3, 4:
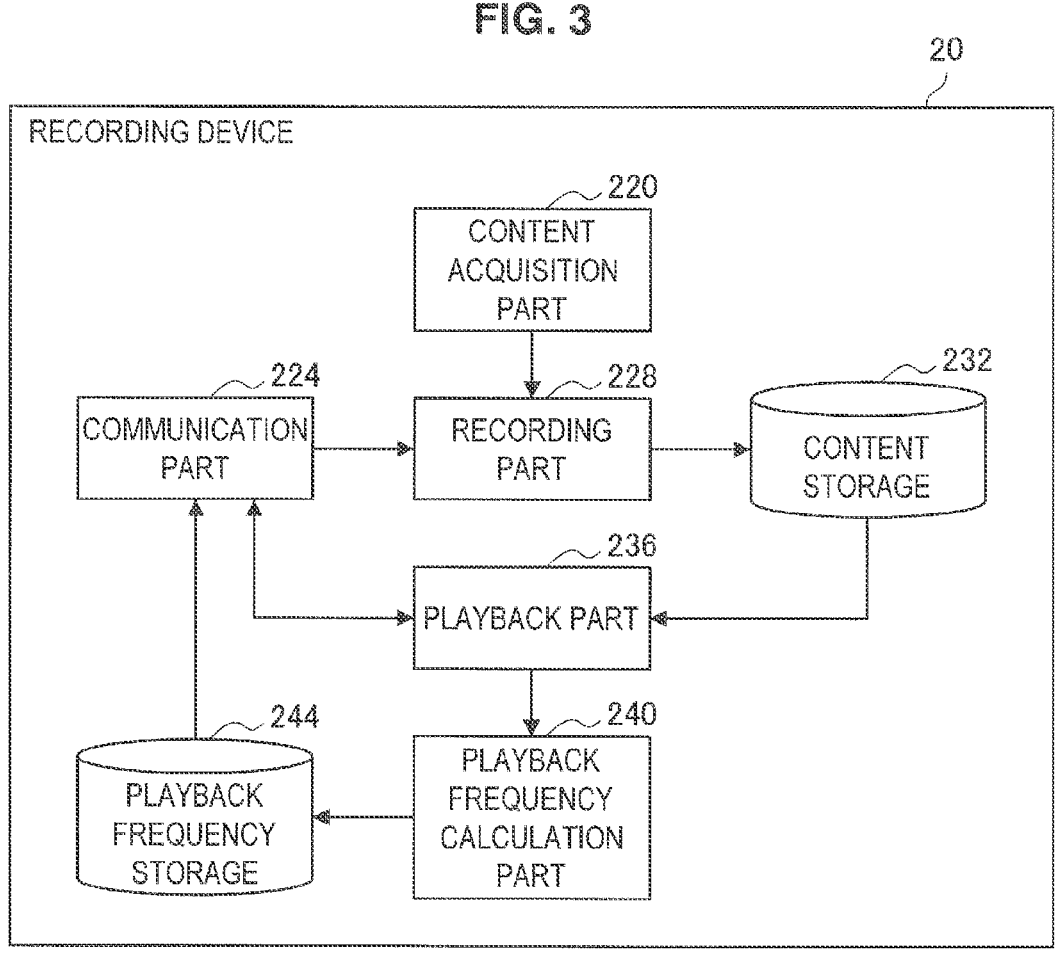
FIG. 3 is a functional block diagram showing a configuration of a recording device according to the first embodiment.
FIG. 4 is an explanatory diagram showing a specific example of a playback frequency for each usage purpose of an application.

FIG. 3 is a functional block diagram showing a configuration of the recording device 20 according to the first embodiment. As shown in FIG. 3, the recording device 20 according to the first embodiment includes a content acquisition part 220, a communication part 224, a recording part 228, a content storage 232, a playback part 236, a playback frequency calculation part 240, and a playback frequency storage 244.

(Content Acquisition Part)

The content acquisition part 220 acquires content to be recorded in the content storage 232. The content acquisition part 220 is a tuner connected to a broadcast reception antenna, for example, and acquires television broadcast content. Further, the content acquisition part 220 may also acquire content transmitted through a communication network such as the Internet.

(Communication Part)

The communication part 224 is an interface to another device included in the control system. For example, the communication part 224 functions as a receiver that receives an instruction to record content and an instruction to play back content from the control device 10, and as a transmitter that transmits information indicating a playback frequency, which will be described later, and a played back content.

(Recording Part)

The recording part 228 records the content acquired by the content acquisition part 220 in the content storage 232. To be specific, when the communication part 224 receives the instruction to record content from the control device 10, the recording part 228 records the designated content in the content storage 232. For example, when the communication part 224 receives information indicating a channel from the control device 10, the recording part 228 records the content acquired by the content acquisition part 220 in the relevant channel in the content storage 232.

Here, the communication part 224 receives from the control device 10 as the instruction to record content, a user ID and a usage log indicating a usage purpose of the communication terminal 30, in addition to the information indicating content. To be more specific, the usage log of the communication terminal 30 indicates a usage purpose (use of telephone application or use of e-mail application) of the application which has been a trigger for the instruction of the relevant recording. The recording part 228 records, in addition to content, the usage log of the communication terminal 30 in association with the user ID in the content storage 232.

(Content Storage)

The content storage 232 stores content, a user ID, and information indicating a usage purpose of the communication terminal 30 in association with each other. The content storage 232 may be a storage medium such as non-volatile memory, a magnetic disk, an optical disc, and a magneto optical (MO) disk. Examples of the non-volatile memory include flash memory, an SD card, a micro SD card, USB memory, electrically erasable programmable read-only memory (EEPROM), and erasable programmable ROM (EPROM). Examples of the magnetic disk include a hard disk and a disc-shaped magnetic disk. Examples of the optical disc include a compact disc (CD), a digital versatile disc (DVD), and a Blu-Ray Disc (BD (registered trademark)).

Note that although the content storage 232 and the playback frequency storage 244 are shown as separate functional blocks in FIG. 3, the function of the content storage 232 and the function of the playback frequency storage 244 may be achieved with a single storage medium.

(Playback Part)

The playback part 236 reads content stored in the content storage 232, and plays back the read content. To be specific, when the communication part 224 receives the instruction to play back content from the control device 10, the playback part 236 reads from the content storage 232 and plays back the designated content. The content played back by the playback part 236 is transmitted to another device included in the control system from the communication part 224. For example, the content played back by the playback part 236 may be transmitted from the communication part 224 to the control device 10, and then transmitted to the display device 40 or the communication terminal 30, or the content played back by the playback part 236 may be transmitted directly to the display device 40 or the communication terminal 30. Note that, in the present specification, processing including at least one of reading, decoding, D/A conversion, and outputting may be referred to as "playback".

(Playback Frequency Calculation Part)

The playback frequency calculation part 240 calculates an ex-post playback frequency of content recorded in the content storage 232 for each usage purpose of an application which has been a trigger for the content recording. That is, the playback frequency calculation part 240 calculates a playback frequency of content recorded with a trigger of the use of an e-mail application, a playback frequency of content recorded with a trigger of the use of a telephone application, and a playback frequency of content recorded with a trigger of the use of a browsing application.

The playback frequency storage 244 stores the playback frequency for each usage purpose of an application calculated by the playback frequency calculation part 240. Specific explanation will be given with reference to FIG. 4.

FIG. 4 is an explanatory diagram showing a specific example of a playback frequency for each usage purpose of an application. In the example shown in FIG. 4, the playback frequency of content recorded with the trigger of the use of the e-mail application is "45%", the playback frequency of content recorded with the trigger of the use of the telephone application is "72%", and the playback frequency of content recorded with the trigger of the use of the browsing application is "12%". The information indicating the playback frequency is transmitted from the communication part 224 to the control device 10 for control of the recording processing in the control device 10.

<1-3. Configuration of Control Device>

Heretofore, the configuration of the recording device 20 according to the present embodiment has been described. Next, a configuration of the control device 10 according to the present embodiment will be described.

Figure 5:
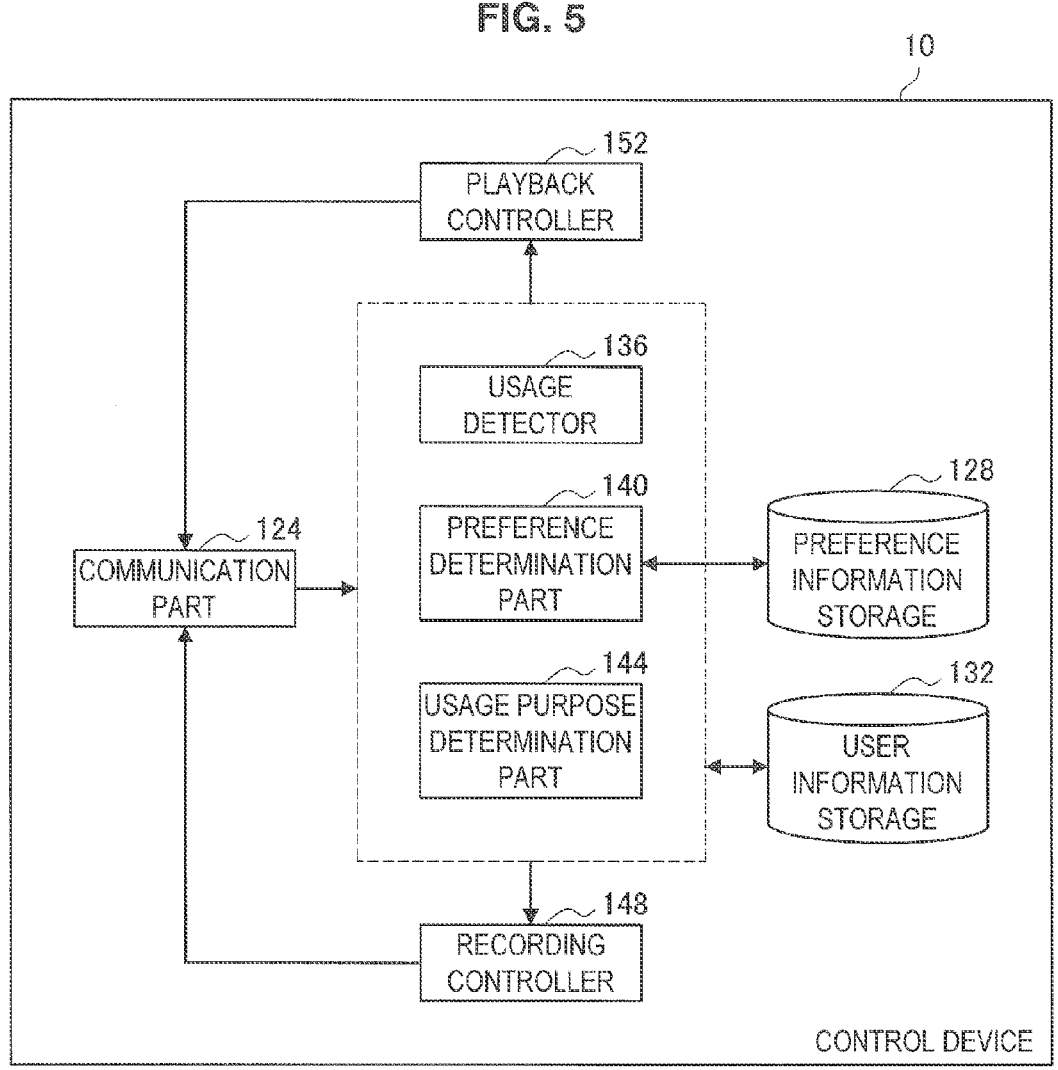
FIG. 5 is a functional block diagram showing a configuration of a control device according to the first embodiment.

FIG. 5 is a functional block diagram showing a configuration of the control device 10 according to the first embodiment. As shown in FIG. 5, the control device 10 according to the present embodiment includes a communication part 124, a preference information storage 128, a user information storage 132, a usage detector 136, a preference determination part 140, a usage purpose determination part 144, a recording controller 148, and a playback controller 152.

(Communication Part)

The communication part 124 is an interface to another device included in the control system. For example, the communication part 124 receives information indicating content output by the display device 40 from the display device 40, and receives information indicating an application usage status in the communication terminal 30 from the communication terminal 30. Further, the communication part 124 transmits an instruction to record content and an instruction to play back content to the recording device 20.

(Preference Information Storage)

The preference information storage 128 stores preference information for each user. For example, the preference information storage 128 stores preference for each user about a genre or an actor/actress regarding content. Note that the preference information of each user can be acquired from a past content viewing history. Further, the preference information storage 128 may be a storage medium such as non-volatile memory, a magnetic disk, an optical disc, and an MO disk. Further, although the preference information storage 128 and the user information storage 132 are shown as separate functional blocks in FIG. 5, the function of the preference information storage 128 and the function of the user information storage 132 may be achieved with a single storage medium.

(User Information Storage)

The user information storage 132 stores a user, a communication terminal 30, and a display device 40 in association with each other. Since the association of the user, the communication terminal 30, and the display device 40 has been described in "1-1. Overview of first embodiment" with reference to FIG. 2, the detailed description will be omitted here.

(Usage Detector)

The usage detector 136 detects use of an application on the communication terminal 30 on the basis of information received by the communication part 124 from the communication terminal 30. For example, the communication part 124 receives information indicating an application that is being used in the communication terminal 30, and the usage detector 136 detects, on the basis of the information, use of a telephone application or an e-mail application on the communication terminal 30.

Note that the use of application includes use responding to reception processing performed by the communication terminal 30, and use for transmission processing performed by the communication terminal 30. Examples of the use responding to reception processing performed by the communication terminal 30 include start of telephone communication responding to an incoming call from another communication terminal (use of telephone application), viewing of an incoming e-mail responding to reception of the e-mail (use of e-mail application), and viewing of a web page responding to acquisition of the web page (use of browsing application). Further, examples of the use for transmission processing performed by the communication terminal 30 include an acceptance of an operation for performing outgoing call to another communication terminal (use of telephone application), creation of an outgoing e-mail (use of e-mail application), and designation of a web page to be acquired (use of browsing application).

(Preference Determination Part)

The preference determination part 140 determines whether content that is being output on the display device 40 matches preference of a user of the communication terminal 30 from which use of an application is detected, by referring to preference information of the user stored in the preference information storage 128.

(Usage Purpose Determination Part)

The usage purpose determination part 144 determines whether the usage purpose of the application detected by the usage detector 136 relates to content that is being output on the display device 40. For example, the usage purpose determination part 144 determines whether a keyword designated as a search word of the browsing application or a term included in an outgoing e-mail which is being created in the e-mail application relates to the content that is being output on the display device 40.

(Recording Controller)

The recording controller 148 controls content recording processing performed by the recording device 20, that is, the recording controller 148 controls recording. For example, on the basis of a detection result obtained by the usage detector 136 and a determination result obtained by the preference determination part 140 and the usage purpose determination part 144, the recording controller 148 issues an instruction to record content that is being output on the display device 40 to the recording device 20. The detail will be described later, and the recording controller 148 issues an instruction to record content in the case where it is estimated that the attention of the user wanders off from the content that is being output on the display device 40 on the basis of the detection result obtained by the usage detector 136, and the determination results obtained by the preference determination part 140 and the usage purpose determination part 144. According to such a configuration, since the recording of the content that the user may have missed can be performed automatically, the user can perform ex-post viewing of the part of the content that the user has missed. Note that the recording controller 148 may issue an instruction to stop recording the content at the time point that the attention of the user returns to the display device 40, or may cause the recording device 20 to continue recording until the end of the content for performing chasing playback. The recording controller 148 may determine whether to stop or continue the recording on the basis of the contents set in advance.

(Playback Controller)

The playback controller 152 controls playback processing of content recorded by the recording device 20. For example, in the case where, after the attention of the user has wandered off from the display device 40 and the recording processing has started, the attention of the user has returned to the display device 40, for example, in the case where the use of the application has terminated, the playback controller 152 issues an instruction to perform chasing playback of the content recorded in the recording processing to the recording device 20.

However, in the case where there is another user viewing the content on the display device 40, viewing of the other user is disturbed if the display device 40 starts the chasing playback. Therefore, the playback controller 152 determines which of the display device 40 and the user's communication terminal 30 is to output the content, in accordance with whether there is another user viewing the content on the display device 40. A specific flow will be described in "1-5. Control operation of playback processing".

<1-4. Control Operation of Recording Processing>

Heretofore, the configuration of the control device 10 according to the present embodiment has been described. Next, a control operation of recording processing will be described.

First Control Example

Figure 6:
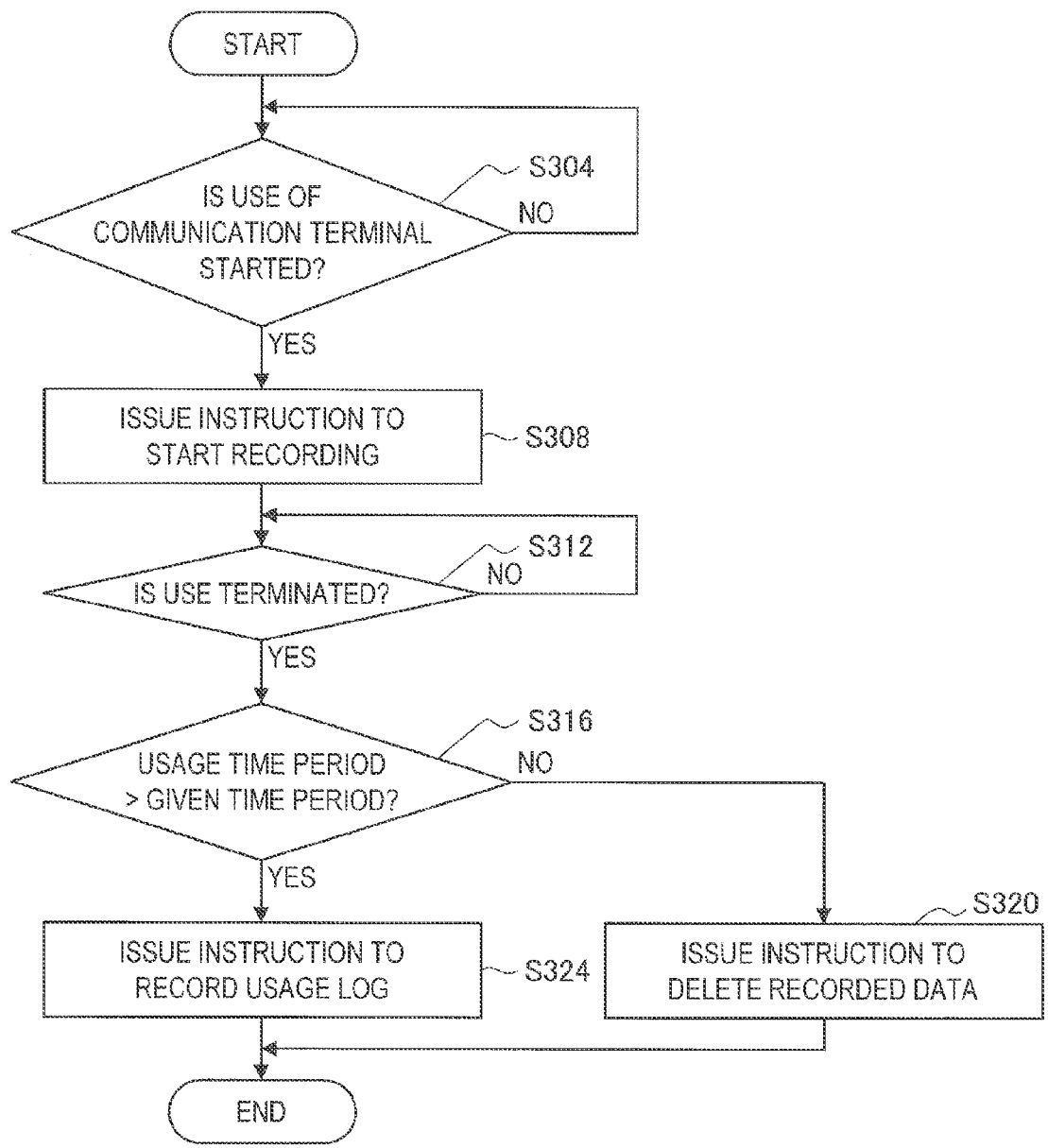
FIG. 6 is a flowchart showing a first control example of recording processing.

FIG. 6 is a flowchart showing a first control example of recording processing. As shown in FIG. 6, first, when the usage detector 136 detects start of use of a communication terminal 30 (S304), the recording controller 148 issues an instruction to record content that is being output on the display device 40 associated with the communication terminal 30 through the communication part 124 to the recording device 20 (S308).

After that, when the use of the communication terminal 30 is terminated (S312), the recording controller 148 determines whether the usage time period of the communication terminal 30 has been more than a given time period (S316). Here, the recording controller 148 may determine the termination of the use of the communication terminal 30 based on the termination of e-mail transmission for an e-mail application and based on the termination of telephone communication for a telephone application. Further, in the case where an attitude indicating that the communication terminal 30 is placed on something is detected, the recording controller 148 may determine that the use of the communication terminal 30 is terminated.

Then, in the case where the usage time period of the communication terminal 30 is less than or equal to the given time period (for example, three minutes) (S316/NO), an attention of a user may not have wandered off from the display device 40, so the recording controller 148 issues an instruction to delete the recorded data to the recording device 20 (S320). Note that it is also possible to add the following to the determination condition: whether the line of sight of the user turns toward the display device 40 by performing facial recognition on an image obtained by the imaging part 42 of the display device 40.

On the other hand, in the case where the usage time period of the communication terminal 30 is more than the given time period (S316/YES), the attention of the user may have wandered off from the display device 40, so the recording controller 148 issues an instruction to save the recorded data and to record a usage log to the recording device 20 (S324). Hereinafter, the usage log will be described in detail with reference to FIG. 7.

—Usage Log

FIG. 7 is an explanatory diagram showing a specific example of a usage log. As shown in FIG. 7, the usage log indicates usage purposes and usage periods of a communication terminal 30 detected during output of content. The usage log shown in FIG. 7 indicates that while the display device 40 outputs Digital_8ch, the telephone application of the communication terminal 30 of the user A has been used.

Figure 8:
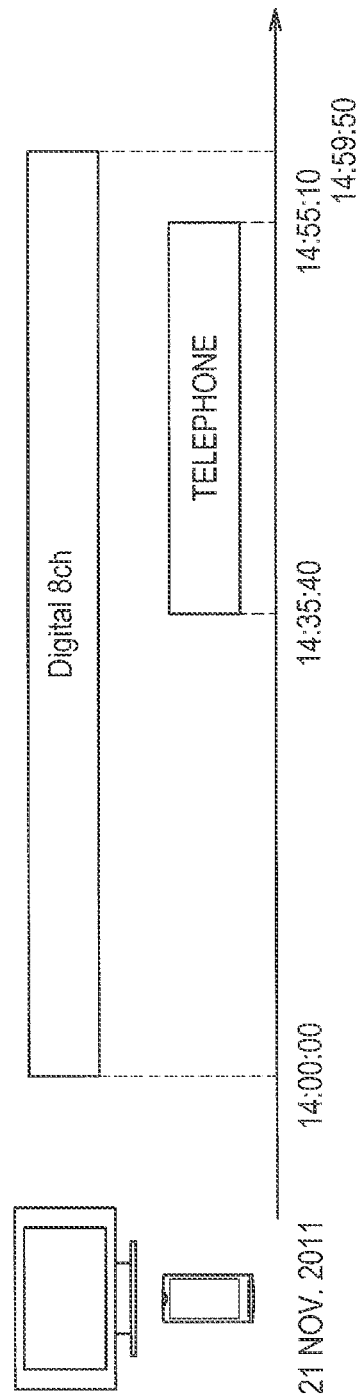
FIG. 8 is an explanatory diagram showing an example of a display mode of a usage log.

Note that this usage log can be visually presented to the user. For example, the control device 10 may acquire the usage log from the recording device 20 and, as shown in FIG. 8, may cause the display device 40 or the communication terminal 30 to display the usage history of the communication terminal 30 on a time line. According to such a configuration, the user can intuitively grasp the usage history of the communication terminal 30.

—Supplement

Figure 9:
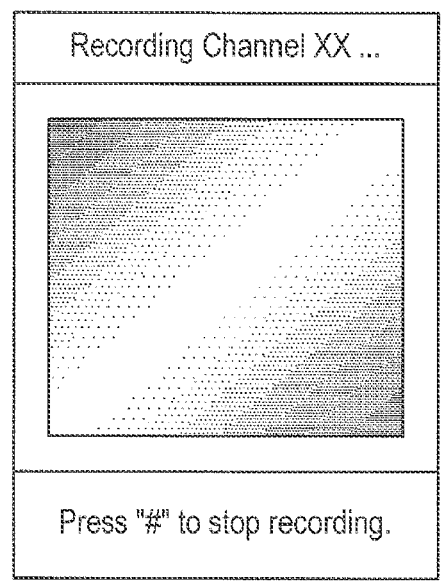
FIG. 9 is an explanatory diagram showing a specific example of a notification screen for a user.

Note that, the example has been described with reference to FIG. 6 that, once the use of the communication terminal 30 is detected, the recording of content is continued until the use is terminated, but the present embodiment is not limited to such an example. For example, in the case where the recording of content is started, the control device 10 may cause the communication terminal 30 to display a screen showing a notice of executing content recording as shown in FIG. 9, and may control the recording processing in accordance with an operation input performed by the user on the relevant screen. To be specific, in the case where the user presses "#" on the screen shown in FIG. 9, the control device 10 may issue an instruction to stop recording to the recording device 20. According to such a configuration, it becomes possible to notify the user that the recording is being performed and also to reflect the user's intention on the recording control.

Second Control Example

Figure 10:
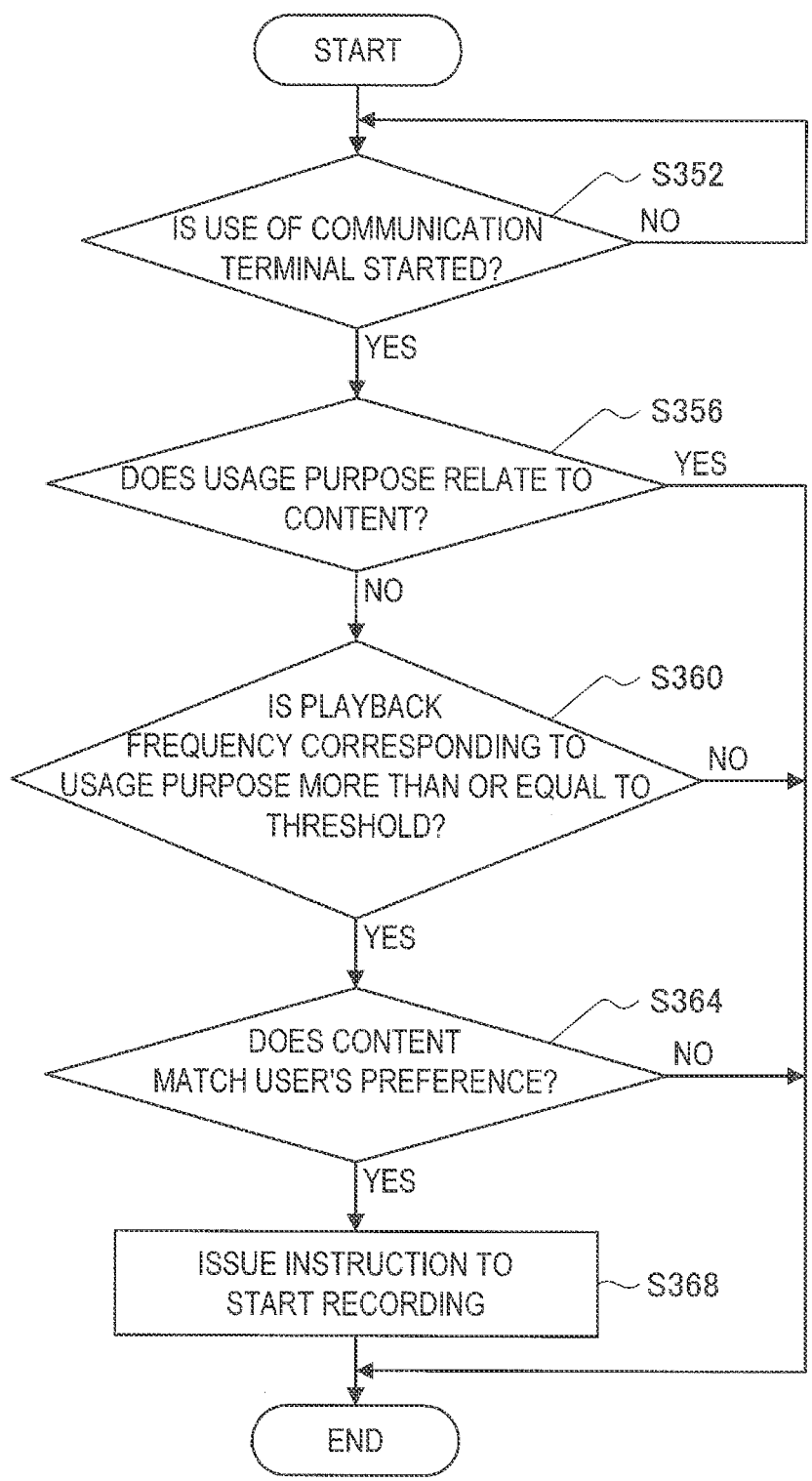
FIG. 10 is a flowchart showing a second control example of recording processing.

FIG. 10 is a flowchart showing a second control example of recording processing. As shown in FIG. 10, first, when the usage detector 136 detects start of use of a communication terminal 30 (S352), the usage purpose determination part 144 determines whether a usage purpose of the communication terminal 30 detected by the usage detector 136 relates to content that is being output on the display device 40 (S356). Here, in the case where it is determined that there is a relationship between the usage purpose of the communication terminal 30 and the content, since it can be considered that the user continues viewing the content, the control device 10 does not issue an instruction to record the content.

On the other hand, in the case where the usage purpose determination part 144 determines that there is no relationship between the usage purpose of the communication terminal 30 and the content, the usage purpose determination part 144 further determines whether the playback frequency corresponding to the usage purpose of the communication terminal 30 is more than or equal to a threshold (S360). For example, in the case where the usage purpose of the communication terminal 30 is the use of the telephone application, the playback frequency corresponding to the use of the telephone application is "72%" as shown in FIG. 4, and the threshold is 50%, the usage purpose determination part 144 determines that the playback frequency corresponding to the usage purpose of the communication terminal 30 is more than or equal to the threshold. Here, in the case where the playback frequency corresponding to the usage purpose of the communication terminal 30 is less than the threshold, it is less likely that the recorded content is played back even if the content has been recorded, and thus, the control device 10 does not issue an instruction to record the content.

In the case where the playback frequency corresponding to the usage purpose of the communication terminal 30 is more than or equal to the threshold, the preference determination part 140 determines whether the content that is being output on the display device 40 matches the preference of the user of the communication terminal 30 (S364). Here, in the case where the content does not match the preference of the user, it is less likely that the recorded content is played back even if the content has been recorded, and thus, the control device 10 does not issue an instruction to record the content.

On the other hand, in the case where the content matches the preference of the user, the recording controller 148 issues an instruction to record the content that is being output on the display device 40 to the recording device 20 (S368). According to such a configuration, in the case where the attention of the user wanders off from the display device 40 and it is considered that the probability that the user plays back the recorded content afterward is high, it becomes possible to automatically record the content that is being output on the display device 40.

<1-5. Control Operation of Playback Processing>

Heretofore, the control operation of recording processing according to the present embodiment has been described. Next, with reference to FIG. 11, the control operation of playback processing will be described.

Figure 11:
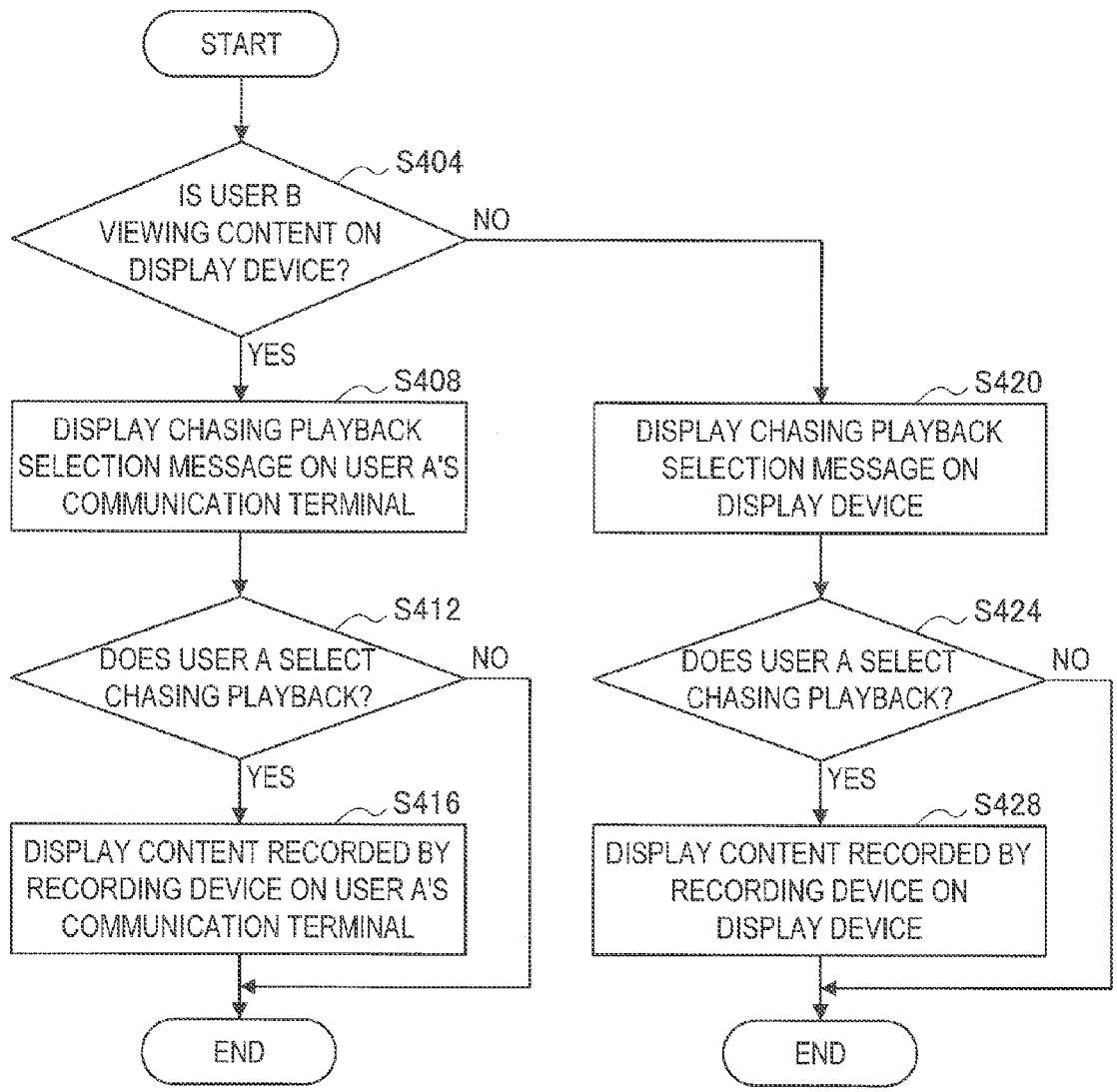
FIG. 11 is a flowchart showing a control operation of playback processing.

FIG. 11 is a flowchart showing a control operation of playback processing. To be more specific, as described in "1-4. Control operation of recording processing", FIG. 11 shows a control operation in the case where, after the attention of the user A has wandered off from the display device 40 and the recording processing has started, the attention of the user A has returned to the display device 40.

First, the playback controller 152 determines whether the user B is viewing content on the display device 40 (S404). The playback controller 152 can perform the determination using various techniques. For example, in the case where the usage detector 136 detects the use of the user B's communication terminal 30, it is considered that the attention of the user B wanders off from the display device 40, so the playback controller 152 may determine that the user B is not viewing the content on the display device 40. However, even if the user B uses the communication terminal 30, in the case where the relevant use relates to the content being output on the display device 40, it may be determined that the user B is viewing the content on the display device 40. Further, the playback controller 152 may perform the determination on the basis of whether the user B's communication terminal 30 is included in a LAN including the control device 10. Still further, the playback controller 152 can perform the determination using other absence detection technology or facial recognition technology.

Then, in the case where it is determined that the user B is viewing the content on the display device 40 (S404/YES), the playback controller 152 causes the user A's communication terminal 30 to display a chasing playback selection message as a confirmation screen for playing back content (S408). Here, in the case where the user A selects the chasing playback (S412), the playback controller 152 causes the user A's communication terminal 30 to display the content recorded by the recording device 20 (S416). For example, the playback controller 152 may transmit the content received from the recording device 20 to the communication terminal 30, or may issue an instruction, to the recording device 20, to transmit the content to the communication terminal 30.

Note that the playback controller 152 may automatically start the playback of the content on the user A's communication terminal 30 without causing the user A's communication terminal 30 to display the chasing playback selection message. Further, even in the case where it is determined that the user B is viewing the content on the display device 40, the playback controller 152 may start the playback of the content on the display device 40 if an agreement from the user B has been confirmed. Further, the user may select a chapter from which the user wants to start watching from the chasing playback selection message. Further, the user may select a device to play back the content from the chasing playback selection message. In this case, the playback controller 152 causes the selected device to play back the content after the detection of the activation of the selected device.

Further, the chasing playback may be performed in normal playback speed, and may also be time reduction playback. Examples of the time reduction playback include digest playback, commercial skip playback, and fast-forward playback. In the case where the time reduction playback is performed and the playback position in the communication terminal 30 catches up with the playback position of the display device 40, the communication terminal 30 may display the fact that the playback position has been caught up. After that, according to such a configuration, multiple users can view the content played back by the display device 40 together. Further, in the case where the communication terminal 30 displays the content while the user operates the communication terminal 30, the content may be displayed on a small screen placed at a part of the display screen.

On the other hand, in the case where it is determined that the user B is not viewing the content on the display device 40 (S404/NO), the playback controller 152 causes the display device 40 to display a chasing playback selection message (S420). Here, in the case where the user A selects the chasing playback (S424), the playback controller 152 causes the display device 40 to display the content recorded by the recording device 20 (S428). For example, the playback controller 152 may transmit the content received from the recording device 20 to the display device 40, or may issue an instruction, to the recording device 20, to transmit the content to the display device 40.

Note that the playback controller 152 may automatically start the playback of the content on the display device 40 without causing the display device 40 to display the chasing playback selection message. Further, the user may select a chapter from which the user wants to start watching from the chasing playback selection message. Further, the user may select a device to play back the content from the chasing playback selection message. In this case, the playback controller 152 causes the selected device to play back the content after the detection of the activation of the selected device. Further, the chasing playback may be performed in normal playback speed, and may also be time reduction playback. The display device 40 may display the content on a small screen placed at a part of the display screen.

2. Second Embodiment

Heretofore, the first embodiment of the present disclosure has been described. Next, a second embodiment of the present disclosure will be described. In the first embodiment, the example of recording content in accordance with the use of the communication terminal 30 has been described. In the second embodiment, a usage log that functions as timing data in accordance with the use of the communication terminal 30 can be recorded. Hereinafter, the second embodiment will be described.

<2-1. Overview of Second Embodiment>

Figure 12:
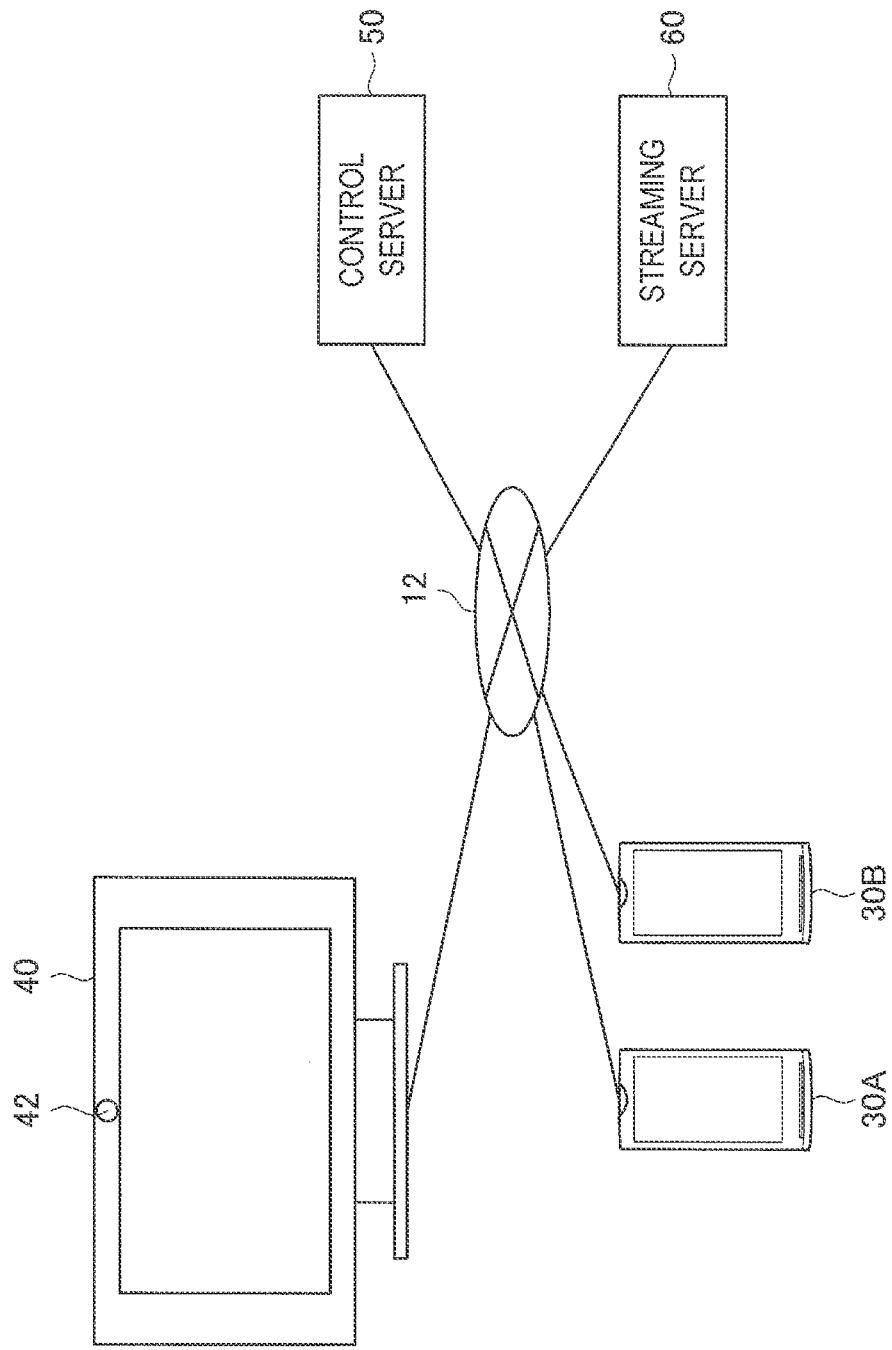
FIG. 12 is an explanatory diagram showing a control system according to a second embodiment.

FIG. 12 is an explanatory diagram showing a control system according to the second embodiment. As shown in FIG. 12, the control system according to the second embodiment includes a communication network 12, a communication terminal 30, a display device 40, a control server 50, and a streaming server 60. The communication terminal 30, the display device 40, the control server 50, and the streaming server 60 are connected to each other through the communication network 12.

Note that the communication network 12 is a wired or wireless transmission path for information transmitted from devices connected to the communication network 12. For example, the communication network 12 may include a public line network such as the Internet, a telephone line network, or a satellite communication network, a local area network (LAN) including Ethernet (registered trademark), or a wide area network (WAN). Further, the communication network 12 may also include a leased line network such as the Internet protocol-virtual private network (IP-VPN).

The communication terminal 30 has one or two or more applications, and performs communication corresponding to the application. The display device 40 is an example of a content output device which outputs content including a video and an audio, and performs video display of content, audio output of content, and the like. Further, the display device 40 includes an imaging part 42 which images a range that the display device 40 is capable of viewing. Such communication terminal 30 and display device 40 are described in the first embodiment, therefore, the detailed description will be omitted here.

The streaming server 60 stores content, and stream-distributes the stored content. The content distributed from the streaming server 60 is output by the display device 40, for example. Note that, the streaming server 60 may start stream-distribution of the designated content in response to a request from the communication terminal 30, the display device 40, or the control server 50.

The control server 50 associates the communication terminal 30 with the display device 40, and, on the basis of information obtained from the communication terminal 30, the control server 50 controls recording processing and playback processing related to content. The association of the communication terminal 30 with the display device 40 is as described in the first embodiment, therefore, there will be briefly described hereinafter the control of the recording processing and the control of the playback processing. Note that, in FIG. 12, the control server 50 is shown as a separate device from the display device 40 and the streaming server 60, but a part of or the entire functions of the control server 50 can be implemented on another device such as the display device 40 and the streaming server 60.

(Control of Recording Processing)

As described in the first embodiment, there may be a case where, while the display device 40 is outputting content, the attention of the user wanders off from the display device 40 and the user misses the content. For example, when the user uses the telephone application in response to an incoming call to the communication terminal 30, there is a case where the user misses the content that is output during the phone call.

From this viewpoint, the control server 50 records a usage log including timing data corresponding to the timing at which the use of the application of the communication terminal 30 associated with the display device 40 is detected. For example, the control server 50 records a usage log indicating a timing at which the use of the application of the communication terminal 30 is started, and a timing at which the use of the application is terminated. According to such a configuration, since the part of the content that the user may have missed can be specified, it becomes possible for the user to view afterward the part that the user has missed. Note that the detail of the recording processing will be described in "2-2. Configuration of control server".

(Control of Playback Processing)

In the case where, after the attention of the user has wandered off from the display device 40 and the recording processing has been performed, the attention of the user has returned to the display device 40, for example, in the case where the use of the application has terminated, the control server 50 issues, to the streaming server 60, an instruction to perform chasing playback of the content of which the control server 50 has recorded the usage log.

However, in the case where there is another user viewing the content on the display device 40, viewing of the other user is disturbed if the display device 40 starts the chasing playback. Therefore, the control server 50 according to the present embodiment determines which of the display device 40 and the user's communication terminal 30 is to output the content, in accordance with whether there is another user viewing the content on the display device 40. Note that the detail of the playback processing will be described in "2-2. Configuration of control server" and "2-3. Operation of control system".

<2-2. Configuration of Control Server>

Heretofore, the overview of the control system according to the second embodiment has been described. Next, a configuration of the control server 50 included in the control system according to the second embodiment will be described.

Figure 13:
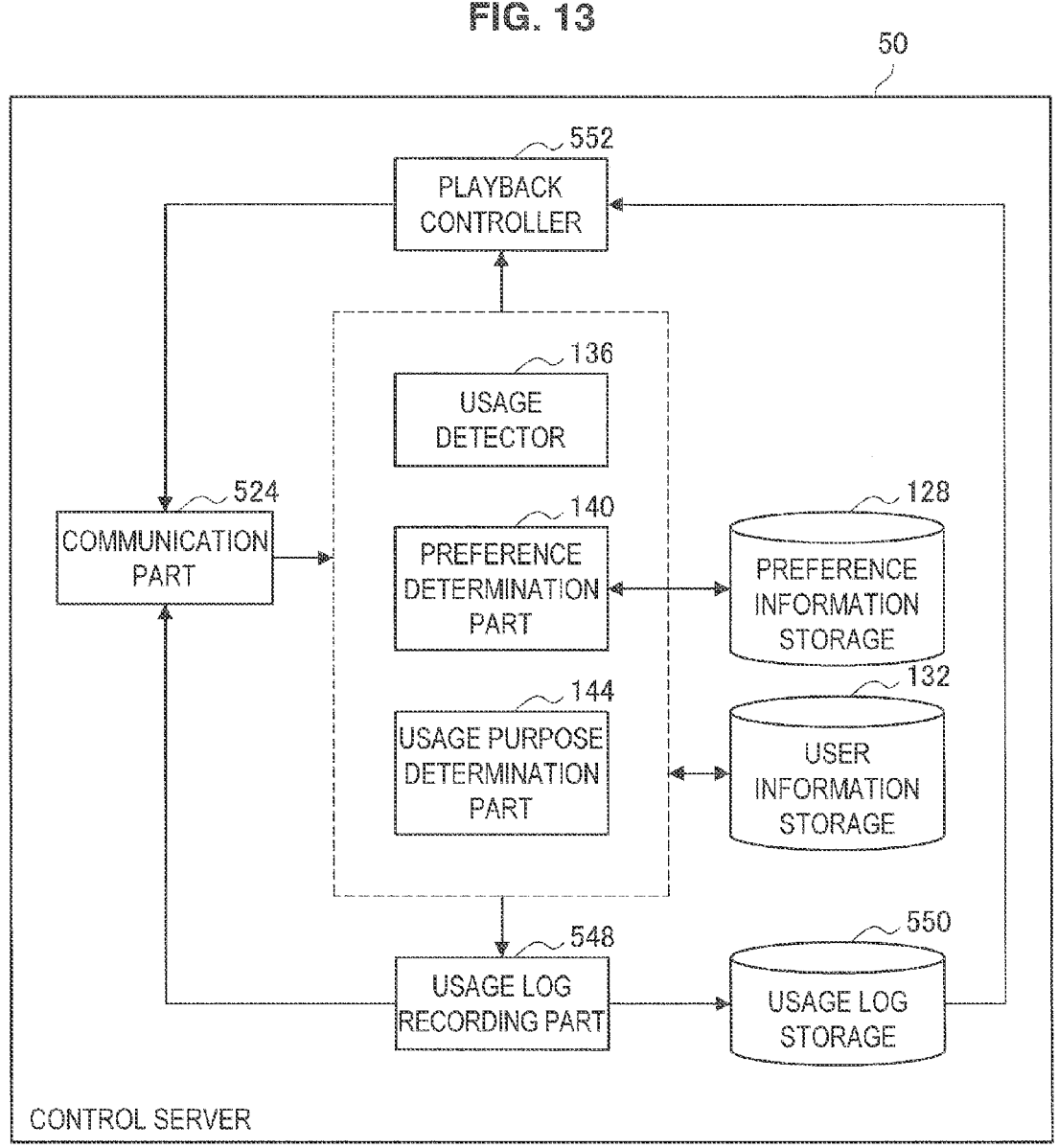
FIG. 13 is a functional block diagram showing a configuration of a control server according to the second embodiment.

FIG. 13 is a functional block diagram showing a configuration of the control server 50 according to the second embodiment. As shown in FIG. 13, the control server 50 according to the present embodiment includes a communication part 524, a preference information storage 128, a user information storage 132, a usage detector 136, a preference determination part 140, a usage purpose determination part 144, a usage log recording part 548, a usage log storage 550, and a playback controller 552. Note that, since the preference information storage 128, the user information storage 132, the usage detector 136, the preference determination part 140, and the usage purpose determination part 144 are as described in the first embodiment, the detailed description will be omitted here.

(Communication Part)

The communication part 524 is an interface to another device included in the control system. For example, the communication part 524 receives information indicating content output by the display device 40 from the display device 40 or the streaming server 60, and receives information indicating an application usage status in the communication terminal 30 from the communication terminal 30. Further, the communication part 524 transmits an instruction to play back content to the streaming server 60.

(Usage Log Recording Part)

The usage log recording part 548 stores a usage log indicating a usage history of the communication terminal 30 in the usage log storage 550. For example, the usage log recording part 548 stores, in the usage log storage 550, the usage log related to the content that is being output on the display device 40, on the basis of a detection result obtained by the usage detector 136 and a determination result obtained by the preference determination part 140 and the usage purpose determination part 144. To be more specific, the usage log recording part 548 records the usage log in the usage log storage 550 in the case where it is estimated that the attention of the user wanders off from the content that is being output on the display device 40 on the basis of the detection result obtained by the usage detector 136, and the determination results obtained by the preference determination part 140 and the usage purpose determination part 144. Further, the usage log recording part 548 may record the usage log in the usage log storage 550 in the case where the content which is likely to be played back by the user afterward is output. Note that, since the determination on whether the attention of the user wanders off from the content that is being output on the display device 40 and determination on the probability that the user plays back the content afterward are as described in "1-4. Control operation of recording processing", the detailed description will be omitted here.

(Usage Log Storage)

The usage log storage 550 stores a user, content, and a usage log of the communication terminal 30 in association with each other. With reference to FIG. 14, the usage log will be described specifically.

FIG. 14 is an explanatory diagram showing a specific example of a usage log according to the second embodiment. As shown in FIG. 14, the usage log indicates the usage purpose and the usage period of the communication terminal 30 detected during output of content. The usage log shown in FIG. 14 indicates that the display device 40 is outputting content #X during the time period from 14:00:00 to 14:59:50, and a telephone application of the user A's communication terminal 30 has been used during the time period from 14:35:40 to 14:55:10. Based on this usage log, it can be estimated that the attention of the user A has been wandered off from the display device 40 during the time period from 35 minutes 40 seconds to 55 minutes 10 seconds from the playback start position of the content #X. Note that although FIG. 14 expresses the timing data in absolute time, the timing data may be expressed based on the content playback start time.

Figure 15:
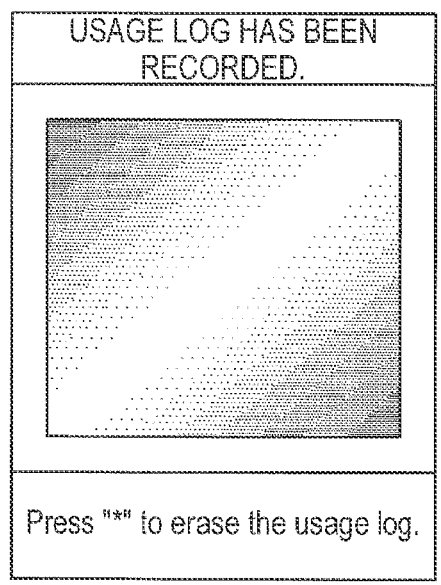
FIG. 15 is an explanatory diagram showing a specific example of a notification screen for a user.

Further, in the case where the control server 50 records the usage log, the control server 50 may cause the communication terminal 30 to display a screen showing a notice of executing recording of the usage log as shown in FIG. 15, and may manage the usage log in accordance with an operation input performed by the user on the relevant screen. To be specific, in the case where the user presses "*" on the screen shown in FIG. 15, the control server 50 may erase the usage log. According to such a configuration, it becomes possible to notify the user that the recording of the usage log is being executed, and also to reflect the user's intention on the management of the usage log.

(Playback Controller)

The playback controller 552 controls streaming distribution performed by the streaming server 60. For example, in the case where, after the attention of the user has wandered off from the display device 40 and the recording of the usage log of the communication terminal 30 and the content in association with each other has been performed, the attention of the user has returned to the display device 40, for example, in the case where the use of the application has terminated, the playback controller 552 issues an instruction to perform chasing playback of the content associated with the usage log to the streaming server 60.

However, in the case where there is another user viewing the content on the display device 40, viewing of the other user is disturbed if the display device 40 starts the chasing playback. Therefore, the playback controller 552 determines which of the display device 40 and the user's communication terminal 30 is to output the content, in accordance with whether there is another user viewing the content on the display device 40.

<2-3. Operation of Control System>

Heretofore, the configuration of the control server 50 according to the second embodiment has been described. Next, an operation related to playback of a control system according to the second embodiment will be described.

Figure 16:
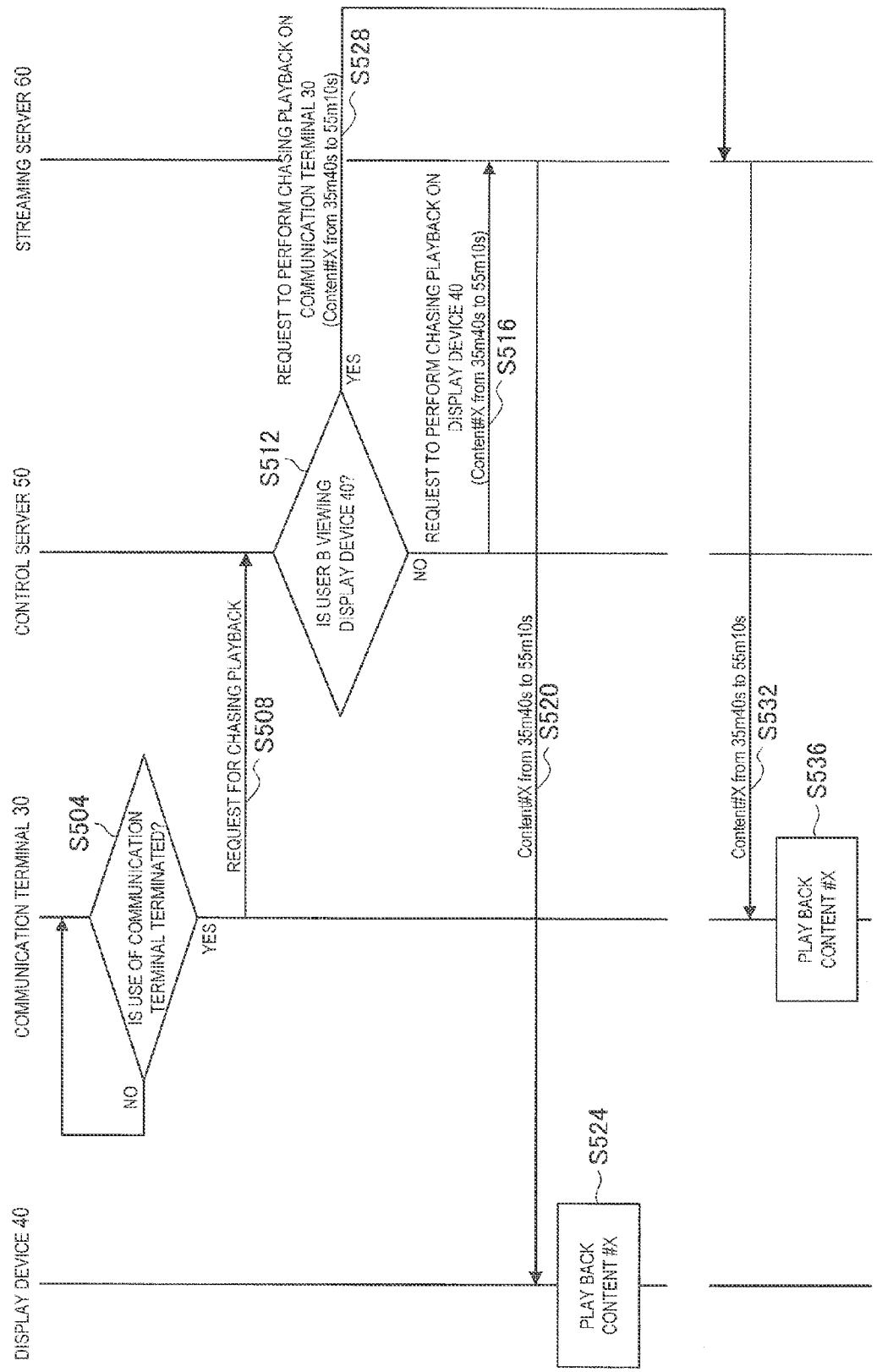
FIG. 16 is an explanatory diagram showing an operation of the control system according to the second embodiment.

FIG. 16 is an explanatory diagram showing an operation of the control system according to the second embodiment. As shown in FIG. 16, when the use of an application in the user A's communication terminal 30 is terminated (S504), the communication terminal 30 sends a request to perform chasing playback of content to the control server 50 (S508).

Subsequently, the playback controller 552 of the control server 50 determines whether the user B is viewing the content on the display device 40 (S512). The playback controller 552 can perform the determination using various techniques. For example, in the case where the usage detector 136 detects the use of the user B's communication terminal 30, it can be considered that the attention of the user B wanders off from the display device 40, so the playback controller 152 may determine that the user B is not viewing the content on the display device 40. However, even if the user B uses the communication terminal 30, in the case where the relevant use relates to the content being output on the display device 40, it may be determined that the user B is viewing the content on the display device 40. Further, the playback controller 552 may perform the determination using other absence detection technology or facial recognition technology.

Here, in the case where it is determined that the user B is not viewing the content on the display device 40 (S512/NO), the playback controller 552 sends, to the streaming server 60, a request to perform chasing playback of the content on the display device 40 (S516). For example, in the case where the usage log storage 550 stores the usage log shown in FIG. 14, the playback controller 552 sends, to the streaming server 60, a request to perform chasing playback on the display device 40 of a data portion from 35 minutes 40 seconds to 55 minutes 10 seconds of the content #X.

Then, according to the request from the playback controller 552 of the control server 50, the streaming server 60 starts streaming distribution of the data portion from 35 minutes 40 seconds to 55 minutes 10 seconds of the content #X to the display device 40 (S520), and the display device 40 starts playback of the content #X (S524).

On the other hand, in the case where it is determined that the user B is viewing the content on the display device 40 (S512/YES), the playback controller 552 sends, to the streaming server 60, a request to perform chasing playback of the content on the communication terminal 30 (S528). For example, in the case where the usage log storage 550 stores the usage log shown in FIG. 14, the playback controller 552 sends, to the streaming server 60, a request to perform chasing playback on the communication terminal 30 of a data portion from 35 minutes 40 seconds to 55 minutes 10 seconds of the content #X.

Then, according to the request from the playback controller 552 of the control server 50, the streaming server 60 starts streaming distribution of the data portion from 35 minutes 40 seconds to 55 minutes 10 seconds of the content #X to the display device 40 (S532), and the communication terminal 30 starts playback of the content #X (S536).

Figure 17:
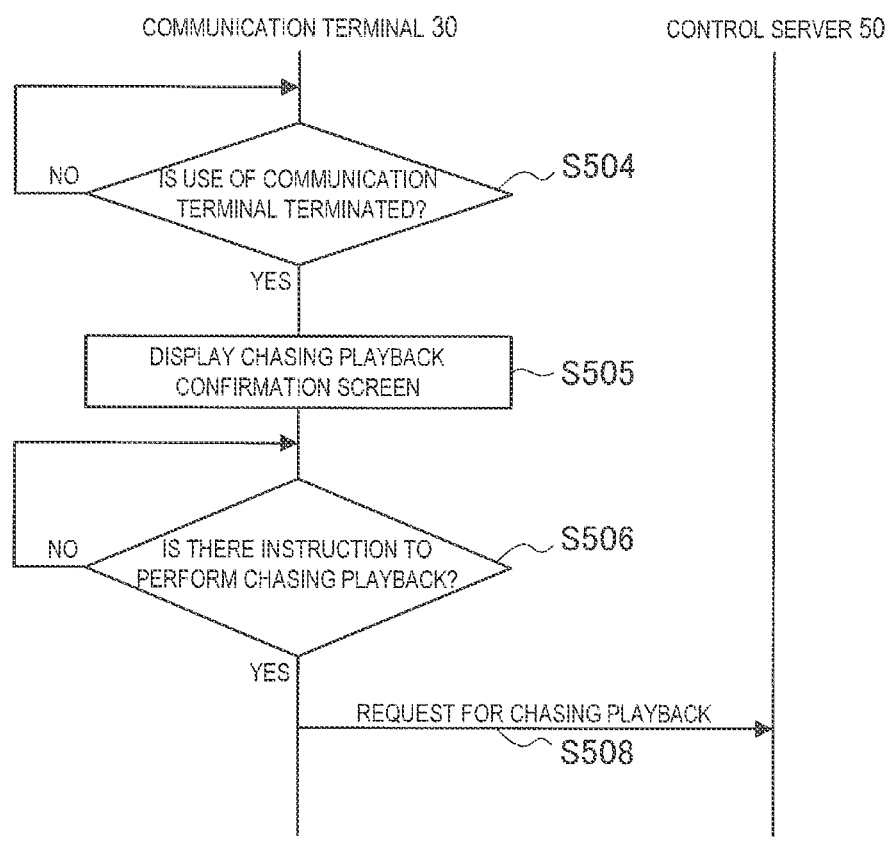
FIG. 17 is an explanatory diagram showing a modified example.

Note that, although the example has been described above that the communication terminal 30 automatically sends the request to perform chasing playback when the use of the communication terminal 30 is terminated, the present embodiment is not limited to such an example. As a modified example, as shown in FIG. 17, the communication terminal 30 displays a chasing playback confirmation screen for confirming whether to perform chasing playback to the user (S505), and, in the case where the user issues an instruction to perform the chasing playback on the chasing playback confirmation screen, the communication terminal 30 may send a request to perform chasing playback to the control server 50 (S506, S508). Further, in the chasing playback confirmation screen, it is also possible to select a device on which the content is to be played back.

(Supplement)

The chasing playback described above may be performed in normal playback speed, and may also be time reduction playback. Examples of the time reduction playback include digest playback and commercial skip playback. Hereinafter, an operation example of the case of performing the time reduction playback will be described. Note that, as shown in FIG. 18, the control server 50 stores information indicating positions of a digest portion and a commercial portion in the content.

FIG. 19 is an explanatory diagram showing an operation example of time reduction playback. As shown in FIG. 19, in the case where the user issues an instruction to perform digest playback or commercial skip playback while the communication terminal 30 plays back the content #X, the communication terminal 30 sends a request to perform the digest playback or the commercial skip playback to the control server 50 (S544).

Receiving the request, the control server 50 refers to the information indicating the positions of the digest portion and the commercial portion, sets one section of the digest portion or one section of content between commercials as a first block, and sends a request to perform streaming to the streaming server 60 (S548). The streaming server 60 transmits the first block of the content to the communication terminal 30 in response to the request from the control server 50 (S552), and the communication terminal 30 plays back the first block of the content (S556).

After that, the control server 50 sets the next section of the digest portion or one section of content between the next commercials as a second block, and sends a request to perform streaming to the streaming server 60 (S560). The streaming server 60 transmits the second block of the content to the communication terminal 30 in response to the request from the control server 50 (S564), and the communication terminal 30 plays back the second block of the content (S568). By repeating the same processing, the time reduction playback such as the digest playback or the commercial skip playback is achieved.

3. Conclusion

As described above, the control device 10 and the control server 50 according to the embodiments of the present disclosure control recording processing related to content in the case where the attention of the user wanders off from the display device 40 or in the case where it is considered that the probability that the user plays back the recorded content afterward is high. According to such a configuration, it becomes possible for the user to view afterward the part of the content that the user has missed.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the respective steps included in the processing of the control device 10 and the control server 50 according to the present specification are not necessarily processed in a time-series order in accordance with the sequence diagram or the flowcharts. For example, the respective steps included in the processing of the control device 10 and the control server 50 may be processed in different order from the flowcharts or may be processed in a parallel manner.

Further, it is also possible to create a computer program for causing hardware such as a CPU, ROM, and RAM, which are built in the control device 10 and the control server 50, to exhibit substantially the same functions as those of respective structures of the control device 10 and the control server 50 described above. Further, there is also provided a storage medium having the computer program stored therein.

Additionally, the present technology may also be configured as below.

(1)

A control device including:

a detector configured to detect use of an application on a communication terminal; and a controller configured to control recording processing related to content that is being output from a content output device associated with the communication terminal in accordance with a detection result obtained by the detector.

(2)

The control device according to (1), wherein the recording processing related to content includes processing of associating, in accordance with a timing at which the use of the application is detected by the detector, timing data with the content.

(3)

The control device according to (1), wherein the recording processing related to content includes processing of recording the content.

(4)
The control device according to any one of (1) to (3), wherein the detector detects the use of the application responding to reception processing.

(5)
The control device according to any one of (1) to (4), wherein the detector detects the use of the application for transmission processing.

(6)
The control device according to any one of (1) to (5), wherein the application includes an audio communication application.

(7)
The control device according to any one of (1) to (6), wherein the application includes a browsing application.

(8)
The control device according to any one of (1) to (7), wherein, when processing related to the content is executed, the controller causes the communication terminal to display a notice indicating that the processing related to the content is being executed.

(9)
The control device according to (8), wherein the controller controls the recording processing related to content in accordance with an operation input performed by a user based on the notice.

(10)
The control device according to any one of (1) to (9), wherein, in a case where the use of the application is detected by the detector, the controller controls the recording processing related to content in accordance with whether a usage purpose of the application has a relationship with the content.

(11)
The control device according to any one of (1) to (10), wherein, in a case where, regarding the application detected by the detector, a playback frequency of content which has been subjected to recording processing on the basis of the use of the application exceeds a threshold, the controller controls the recording processing related to content.

(12)
The control device according to any one of (1) to (11), wherein the controller controls the recording processing related to content in accordance with whether the use of the application for more than or equal to a given time period has been detected by the detector.

(13)
The control device according to any one of (1) to (12), wherein the recording processing related to content includes processing of associating a usage log with the content, the usage log indicating a usage purpose of the application detected by the detector.

(14)
The control device according to any one of (1) to (13), wherein, after the use of the application on the communication terminal has been terminated, on the basis of whether there is another user different from a user of the communication terminal, the another user using the content output device, the controller controls playback of the content on the communication terminal or the content output device.

(15)
The control device according to (14), wherein the controller determines whether there is the another user using the content output device, on the basis of the detection result of the use of the application on a communication terminal of the another user, the detection result being obtained by the detector.

(16)
The control device according to (14) or (15), wherein, after the use of the application on the communication terminal has been terminated, on the basis of whether there is another user using the content output device, the controller causes the communication terminal or the content output device to display a screen for confirming playback of the content.

(17)
The control device according to any one of (1) to (16), wherein the controller extracts another content output device associated with a communication terminal of a user detected from a captured image of a range that the content output device is capable of viewing, and controls recording processing related to content output from the extracted content output device in accordance with the use of the application in the communication terminal of the user detected by the detector.

(18)
The control device according to (9), wherein the recording processing related to content includes processing of associating, in accordance with a timing at which the use of the application is detected by the detector, timing data with the content, and
wherein the controller deletes the timing data in accordance with an operation input performed by a user based on the notice.

(19)
The control device according to (9), wherein the recording processing related to content includes processing of recording the content, and
wherein the controller stop the recording processing in accordance with an operation input performed by a user based on the notice.

(20)
A control method including:
detecting use of an application on a communication terminal; and
controlling recording processing related to content that is being output from a content output device associated with the communication terminal in accordance with a detection result of the use of the application.

(21)
A program for causing a computer to function as
a detector configured to detect use of an application on a communication terminal, and
a controller configured to record and control processing related to content that is being output from a content output device associated with the communication terminal in accordance with a detection result obtained by the detector.

(22)
A control system including:
a communication terminal;
a content output device associated with the communication terminal; and
a control device including
a detector configured to detect use of an application on the communication terminal, and
a controller configured to control recording processing related to content that is being output from the content output device in accordance with a detection result obtained by the detector.

REFERENCE SIGNS LIST

10 control device
12 communication network 20 recording device
30 communication terminal
40 display device
42 imaging part
50 control server
60 streaming server
124 communication part
128 preference information storage
132 user information storage
136 usage detector
140 preference determination part
144 usage purpose determination part
148 recording controller
152 playback controller
220 content acquisition part
224 communication part
228 recording part
232 content storage
236 playback part
240 playback frequency calculation part
244 playback frequency storage
524 communication part
548 usage log recording part
550 usage log storage
552 playback controller

The invention claimed is:

1. A control device for selectively controlling playback of content to a content output device used by a first user and also usable by another user, the control device comprising:
   a usage detector configured to detect use by the first user of any one or more of particular applications on a communication terminal, which use diverts the first user's attention from the content output device, the content output device being associated with the communication terminal;
   a detector configured to detect use of the content output device by the first user and by the other user; and
   a controller configured to control recording processing of content that is being output from the content output device when the usage detector detects use by the first user of said one or more particular applications on the communication terminal;
   wherein the controller controls the recording processing for automatic recording of content in response to the detection of the use of said one or more particular applications on the communication terminal by the first user when use of the content output device by the first user is detected,
   wherein the controller controls playback of the recorded content to the associated content output device in response to completion of the use by the first user of the particular application,
   wherein the controller controls the recording processing based on playback frequency associated with the particular application used by the first user, the playback frequency representing the percentage of time the recorded content is played back when the particular application is used, and
   the controller controls playback of the recorded content to avoid disturbing the other user, by controlling playback to a different output device and not to the associated content output device when the other user is detected as using the content output from the content output device.

2. The control device according to claim 1,
   wherein the recording processing of content includes recording with the content timing data corresponding to a timing at which the use of the application is detected by the usage detector.
3. The control device according to claim 1,
   wherein the usage detector detects the use of the application responding to reception of incoming communication.
4. The control device according to claim 1,
   wherein the usage detector detects the use of the application for transmission of outgoing communication.
5. The control device according to claim 1,
   wherein the applications include an audio communication application.
6. The control device according to claim 1,
   wherein the applications include a browsing application.
7. The control device according to claim 1,
   wherein, when the content is played back to the different output device, the controller causes the communication terminal to display a notice indicating that playback of the content is being executed.
8. The control device according to claim 7,
   wherein the controller controls the recording processing or playback of the content in accordance with an operation input performed by the first user based on the notice.
9. The control device according to claim 1,
   wherein the usage detector detects a usage purpose of the application being used by the first user, and
   wherein, when the use of the application is detected by the usage detector, the controller controls the recording processing of content in accordance with whether the usage purpose of the application is related to the content being output from the associated content output device.
10. The control device according to claim 9,
    wherein the recording processing of content includes associating a usage log with the content, the usage log indicating the usage purpose of the application detected by the usage detector.
11. The control device according to claim 1,
    wherein respective usage purposes of the applications have corresponding playback frequencies, and when the usage purpose of the application detected by the usage detector has a playback frequency that exceeds a threshold, the controller controls the recording processing to record the content.
12. The control device according to claim 1,
    wherein the controller controls the recording of content in accordance with whether the use of the application by the first user for more than or equal to a given time period has been detected by the usage detector.
13. The control device according to claim 1,
    wherein the detector detects use by the other user of the content output device on the basis of the detection result obtained by the usage detector of the use of the application on a communication terminal of the other user.
14. The control device according to claim 13,
    wherein, after the use of the application on the communication terminal of the first user has been terminated, the controller causes the communication terminal of the first user or the associated content output device to display a screen for confirming playback of the content.
15. The control device according to claim 1,
    wherein detection of the use of the content output device by the other user is based on a position of the other user within a range capable of viewing content on the associated content output device, and the controller controls playback of the recorded content to the different output device in accordance with the use of the application in the communication terminal of the first user detected by the usage detector.

16. A control method for selectively controlling playback of content to a content output device used by a first user and also usable by another user, the method comprising:

detecting use by the first user of any one or more of particular applications on a communication terminal used which use diverts the first user's attention from the content output device, the content output device being associated with the communication terminal;

detecting use of the content output device by the first user and by the other user; and controlling recording processing of content that is being output from the content output device when use by the first user of said one or more particular applications on the communication terminal is detected;

wherein the recording processing is controlled for automatic recording of content in response to the detection of the use of said one or more particular applications on the communication terminal by the first user, based on playback frequency associated with the particular application used by the first user, the playback frequency representing the percentage of time the recorded content is played back when the particular application is used, the content being recorded when use of the content output device by the first user is detected, playback of the recorded content to the associated content output device is controlled in response to completion of the use by the first user of the particular application, and playback of the recorded content avoids disturbing the other user, by playing back to a different output device and not to the associated content output device is controlled when the other user is detected as using the content output from the content output device.

17. A non-transitory computer readable medium having recorded thereon a program for causing a computer to function as a control device for selectively controlling playback of content to a content output device used by a first user and also usable by another user, comprising a usage detector configured to detect use by the first user of any one or more of particular applications on a communication terminal, which use diverts the first user's attention from the content output device, the content output device being associated with the communication terminal, a detector configured to detect use of the content output device by the first user and by the other user, and a controller configured to control recording processing of content that is being output from the content output device when the usage detector detects use by the first user of said one or more particular applications on the communication terminal;

wherein the controller controls the recording processing for automatic recording of content in response to the detection of the use of said one or more particular applications on the communication terminal by the first user when use of the content output device by the first user is detected, wherein the controller controls playback to the associated content output device of the recorded content in response to completion of the use by the first user of the particular application, wherein the controller controls the recording processing based on playback frequency associated with the particular application used by the first user, the playback frequency representing the percentage of time the recorded content is played back when the particular application is used, and the controller controls playback of the recorded content to avoid disturbing the other user, by controlling playback to a different output device and not to the associated content output device when the other user is detected as using the content output from the content output device.

18. A control system for selectively controlling playback of content to a content output device used by a first user and also usable by another user, the control system comprising:

a communication terminal;

a content output device associated with the communication terminal; and a control device including a usage detector configured to detect use by the first user of any one or more of particular applications on the communication terminal, which use diverts the first user's attention from the content output device, the content output device being associated with the communication terminal, a detector configured to detect use of the content output device by the first user and by the other user, and a controller configured to control recording processing of content that is being output from the content output device when the usage detector detects use by the first user of said one or more particular applications on the communication terminal;

wherein the controller controls the recording processing for automatic recording of content in response to the detection of the use of said one or more particular applications on the communication terminal by the first user when use of the content output device by the first user is detected, wherein the controller controls playback to the content output device of the recorded content in response to completion of the use by the first user of the particular application, wherein the controller controls the recording processing based on playback frequency associated with the particular application used by the first user, the playback frequency representing the percentage of time the recorded content is played back when the particular application is used, and the controller controls playback of the recorded content to avoid disturbing the other user, by controlling playback to a different output device and not to the content output device when the other user is detected as using the content output from the content output device.

* * * * *